(12) United States Patent
Ye

(10) Patent No.: US 12,213,850 B2
(45) Date of Patent: Feb. 4, 2025

(54) HOLDER ASSEMBLY FOR ELECTRIC TOOTHBRUSH AND ELECTRIC TOOTHBRUSH

(71) Applicant: Shenzhen Shuye Technology Co., Ltd., Guangdong (CN)

(72) Inventor: Hongxin Ye, Zhejiang Province (CN)

( * ) Notice: Subject to any disclaimer, the term of this patent is extended or adjusted under 35 U.S.C. 154(b) by 0 days.

(21) Appl. No.: 18/647,787

(22) Filed: Apr. 26, 2024

(65) Prior Publication Data

US 2024/0366352 A1  Nov. 7, 2024

(30) Foreign Application Priority Data

May 6, 2023  (CN) .......................... 202310511776.9

(51) Int. Cl.
*A61C 17/22* (2006.01)
*A61C 17/34* (2006.01)
*F16F 15/04* (2006.01)

(52) U.S. Cl.
CPC ............ *A61C 17/225* (2013.01); *A61C 17/34* (2013.01); *F16F 15/04* (2013.01)

(58) Field of Classification Search
CPC ......... A61C 17/225; A61C 17/34; F16F 15/04
See application file for complete search history.

(56) References Cited

PUBLICATIONS

Japanese Patent No. JP 2004351104 to Motomura et al published on Dec. 16, 2004.*
Chinese Patent No. CN 111035467 to Guo et al published on Apr. 21, 2020.*
Chinese Patent No. CN 111603261 to Xu et al published on Sep. 1, 2020.*
Chinese Patent No. CN 112641527 to Liao et al published on Apr. 13, 2021.*
Chinese Patent No. CN 216216299 to Yin et al published on Apr. 5, 2022.*
Chinese Patent No. CN 217138316 to Zhou published on Aug. 9, 2022.*
Chinese Patent No. CN 114614617 to Huang et al published on Jun. 10, 2022.*
Chinese Patent No. CN 220193233 to Ye et al published on Dec. 19, 2023.*

\* cited by examiner

*Primary Examiner* — Pamela Rodriguez

(57) ABSTRACT

A holder assembly for an electric toothbrush and an electric toothbrush. The holder assembly includes: a holder body and an elastic cushioning member. The holder body includes a main body portion and a connection structure connected to each other; the connection structure includes an insertion mating portion. The elastic cushioning member includes a mounting cylinder; the mounting cylinder includes a motor cushioning portion; the motor cushioning portion and the insertion mating portion are insertion-connected and fixed in an axial direction of the mounting cylinder. The motor cushioning portion includes a peripheral cushioning surface and an axial cushioning surface; the insertion mating portion includes a peripheral mating surface and an axial mating surface, the peripheral mating surface abuts against and is mated with the peripheral cushioning surface around the axial direction, and the axial mating surface abuts against and is mated with the axial cushioning surface around the axial direction.

18 Claims, 10 Drawing Sheets

HOLDER ASSEMBLY FOR ELECTRIC TOOTHBRUSH AND ELECTRIC TOOTHBRUSH

CROSS REFERENCE

The present disclosure claims priority of Chinese Patent Application No. 202310511776.9, filed on May 6, 2023, the entire contents of which are hereby incorporated by reference in their entirety.

TECHNICAL FIELD

The present disclosure relates to the technical field of electric toothbrushes, and more specifically to a holder assembly for an electric toothbrush, and an electric toothbrush.

BACKGROUND

With the increasing improvement of people's living standards, the use and popularity of electric toothbrushes are increasing. A brush handle assembly of the electric toothbrush includes a housing, a motor, a battery; a mounting holder for fixing the motor and the battery in the housing, etc. When the electric toothbrush is in use, a motor shaft extending from the housing is matingly connected to a brush head, the battery supplies power to the motor, and the brush head is driven to vibrate by a drive shaft of the motor.

In order to improve the assembly efficiency of the internal structure of the brush handle, for the existing product, a motor holder and a battery holder are usually connected as a whole, such that the battery and the motor are fixed to the mounting holder together and can be assembled into the housing through the mounting holder as a whole. However, since the high frequency vibration of the motor is directly transmitted to the mounting holder, the brush handle of the electric toothbrush is strongly vibrated.

In the related art, in order to reduce the vibration, a rubber sleeve is sleeved on a periphery of the motor, and the motor is arranged in the motor holder through the rubber sleeve. In this design, the rubber sleeve is only able to absorb the vibration of the motor in the radial direction of the rubber sleeve, and is unable to absorb the vibration of the motor in the axial direction thereof, such that the overall vibration-damping effect is poor.

The above content is only intended to assist in understanding the technical solution of the present disclosure, and does not mean to recognize the above content as prior art.

SUMMARY OF THE DISCLOSURE

In view of the above problems, the present disclosure proposes a holder assembly for an electric toothbrush, aiming at solving the technical problem of strong vibration and poor vibration damping effect of the electric toothbrush.

In order to realize the above purpose, the proposed holder assembly includes: a holder body, including a main body portion and a connection structure that are connected to each other: wherein the main body portion defines a battery mounting compartment, and the connection structure includes an insertion mating portion; and an elastic cushioning member, including a mounting cylinder: wherein a motor mounting cavity is defined in the mounting cylinder, and the mounting cylinder includes a motor cushioning portion: the motor cushioning portion and the insertion mating portion are insertion-connected and fixed in an axial direction of the mounting cylinder, for connecting the holder body and the elastic cushioning member: wherein the motor cushioning portion includes a peripheral cushioning surface and an axial cushioning surface: the insertion mating portion includes a peripheral mating surface and an axial mating surface, wherein the peripheral mating surface abuts against and is mated with the peripheral cushioning surface around the axial direction of the mounting cylinder, and the axial mating surface abuts against and is mated with the axial cushioning surface around the axial direction of the mounting cylinder.

In some embodiments, the insertion mating portion includes a plurality of insertion protrusions spaced along a peripheral direction of the mounting cylinder, and a first insertion slot is defined between each adjacent two of the plurality of insertion protrusions: bottom walls of a plurality of the first insertion slots and end walls of the plurality of insertion protrusions form the axial mating surface: side walls of the plurality of first insertion slots and side walls of the plurality of insertion protrusions form the peripheral mating surface: the motor cushioning portion includes a plurality of second insertion slots defined on an end wall of the mounting cylinder facing the connection structure, the plurality of second insertion slots being spaced apart along the peripheral direction of the mounting cylinder: a cushioning protrusion is arranged between each adjacent two of the plurality of second insertion slots: bottom walls of the plurality of second insertion slots and end walls of a plurality of the cushioning protrusions form the axial cushioning surface: side walls of the plurality of second insertion slots and side walls of the plurality of cushioning protrusions form the peripheral cushioning surface: the plurality of cushioning protrusions are in one-to-one correspondence with and adapted to be insertion-connected and fixed with the plurality of first insertion slots: the plurality of insertion protrusions are in one-to-one correspondence with and adapted to be insertion-connected and fixed with the plurality of second insertion slots.

In some embodiments, the mounting cylinder further includes an inner enclosure wall, the inner enclosure wall enclosing to define the motor mounting cavity: the plurality of cushioning protrusions are disposed on an outer peripheral wall of the inner enclosure wall, and the inner enclosure wall is embedded in an inner periphery of the insertion mating portion.

In some embodiments, the connection structure further includes a connection ring and a limiting flange, the connection ring being connected to an end of the insertion mating portion back away from the mounting cylinder: the limiting flange is connected to an inner wall surface of the connection ring: the inner enclosure wall protrudes out of the plurality of cushioning protrusions toward a peripheral edge of the main body portion to be embedded in the inner wall surface of the connection ring and to abut against the limiting flange.

In some embodiments, an inner wall surface of the inner enclosure wall is arranged with a plurality of limiting convex bars extending along the axial direction of the mounting cylinder, the plurality of limiting convex bars being spaced apart along a peripheral direction of the inner enclosure wall: a protruding height of each limiting convex bar gradually decreases from the mounting cylinder to the main body portion.

In some embodiments, an inner wall surface of the inner enclosure wall is arranged with a peripheral limiting portion for limiting a rotation of a motor about an axis of the motor.

In some embodiments, for each of at least one of the plurality of cushioning protrusions, a width of the cushioning protrusion in the peripheral direction of the mounting cylinder is greater than a width of a corresponding insertion protrusion adjacent to cushioning protrusion in the peripheral direction of the connection ring.

In some embodiments, the connection structure is connected to an end of the main body portion; a width of each of the plurality of cushioning protrusions in the peripheral direction of the mounting cylinder gradually decreases toward the main body portion: a width of each of the plurality of insertion protrusions in the peripheral direction of the mounting cylinder gradually decreases away from the main body portion.

In some embodiments, in a peripheral direction of the connection ring, a width of an end face of each of the plurality of cushioning protrusions toward the main body portion is greater than half of a maximum width of the each of the plurality of cushioning protrusions, and a width of an end face of each of the plurality of insertion protrusions back away from the main body portion is greater than half of a maximum width of the each of the plurality of insertion protrusions.

In some embodiments, the elastic cushioning member further includes an elastic guide strip connected to the mounting cylinder, the elastic guide strip extending towards the main body portion along the axial direction of the mounting cylinder: the elastic guide strip is partially embedded in and protrudes out of an outer peripheral wall of the main body portion, and an outer wall surface of the elastic guide strip is arranged with a cushioning bump.

In some embodiments, the elastic guide strip includes at least two clastic guide strips spaced apart in the peripheral direction of the mounting cylinder, and each of the at least two elastic guide strips is arranged with at least two the cushioning bumps spaced apart in a length extension direction of the each of the at least two elastic guide strips: the at least two cushioning bumps are disposed around the axial direction of the mounting cylinder on an outer peripheral wall of the each of the at least two elastic guide strips.

In some embodiments, the each of the at least two elastic guide strips defines an embedding slot between adjacent two of the at least two cushioning bumps, and the outer peripheral wall of the main body portion is arranged with an embedding protrusion that is adapted to the embedding slot.

In some embodiments, the elastic cushioning member further includes a first enclosing portion, a second enclosing portion, and a connection arm connecting the first enclosing portion with the second enclosing portion, that are spaced apart in the axial direction of the mounting cylinder; each of the first enclosing portion and the second enclosing portion extends along a peripheral direction of the main body portion, and the first enclosing portion, the second enclosing portion, and the connection arm are embedded in the main body portion: at least one of the first enclosing portion and the second enclosing portion is connected to the at least two elastic guide strips.

In some embodiments, the holder body is injection molded integrally with the clastic cushioning member.

The present disclosure further proposes an electric toothbrush, including a brush handle assembly: wherein the brush handle assembly includes a housing, a motor arranged in the housing, a battery, and the holder assembly as any of the above: a lower end of the motor is arranged in the motor mounting cavity of the holder assembly, and the battery is arranged in the battery mounting compartment of the holder assembly.

The holder assembly for an electric toothbrush, as proposed in the present disclosure, includes a holder body and an elastic cushioning member: the holder body includes a main body portion and a connection structure that are connected to each other: a battery mounting compartment is defined in the main body: the connection structure includes an insertion mating portion, and the clastic cushioning member includes a mounting cylinder: a motor mounting cavity is defined in the mounting cylinder: the mounting cylinder includes a motor cushioning portion, the motor cushioning portion and the insertion mating portion being insertion-connected and fixed in an axial direction of the mounting cylinder, for connecting the holder body and the elastic cushioning member. In this way, the holder body for mounting the battery and the clastic cushioning member for mounting the motor are insertion-connected and fixed in the extension direction of the motor shaft, which may ensure that the clastic cushioning member can dampen the vibration of the clastic cushioning member relative to the holder body in the radial direction of the mounting cylinder. In addition, the holder body and the clastic cushioning member are connected as a whole, such that the battery and the motor can be fixed to the holder assembly together during assembly and assembled into the housing of the brush handle through the holder assembly as a whole, thereby improving the mounting efficiency of the internal structure of the brush handle.

Further, by providing the motor cushioning portion to include the peripheral cushioning surface and the axial cushioning surface, and the insertion mating portion to include the peripheral mating surface and the axial mating surface, the peripheral mating surface and the peripheral cushioning surface abut against and are mated with each other around the axial direction of the mounting cylinder, such that the motor cushioning portion can be elastically deformed with respect to the insertion mating portion around the axial direction of the mounting cylinder: the axial mating surface and the axial cushioning surface abut against and are mated with in the axial direction of the mounting cylinder, such that the motor cushioning portion can be elastically deformed with respect to the insertion mating portion in the axial direction of the mounting cylinder. In this way, after the clastic cushioning member for mounting the motor is fixedly connected to the holder body for mounting the battery, clastic cushioning damping can be realized in the axial direction of the motor shaft, around the axial direction of the motor shaft, and in the radial direction of the motor shaft, so as to realize multi-dimensional damping of the elastic cushioning member with respect to the holder body, which may effectively enhance the vibration damping effect of the entire holder assembly.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and other drawings may be obtained from these drawings by those skilled in the art without creative labor.

Figure 1:
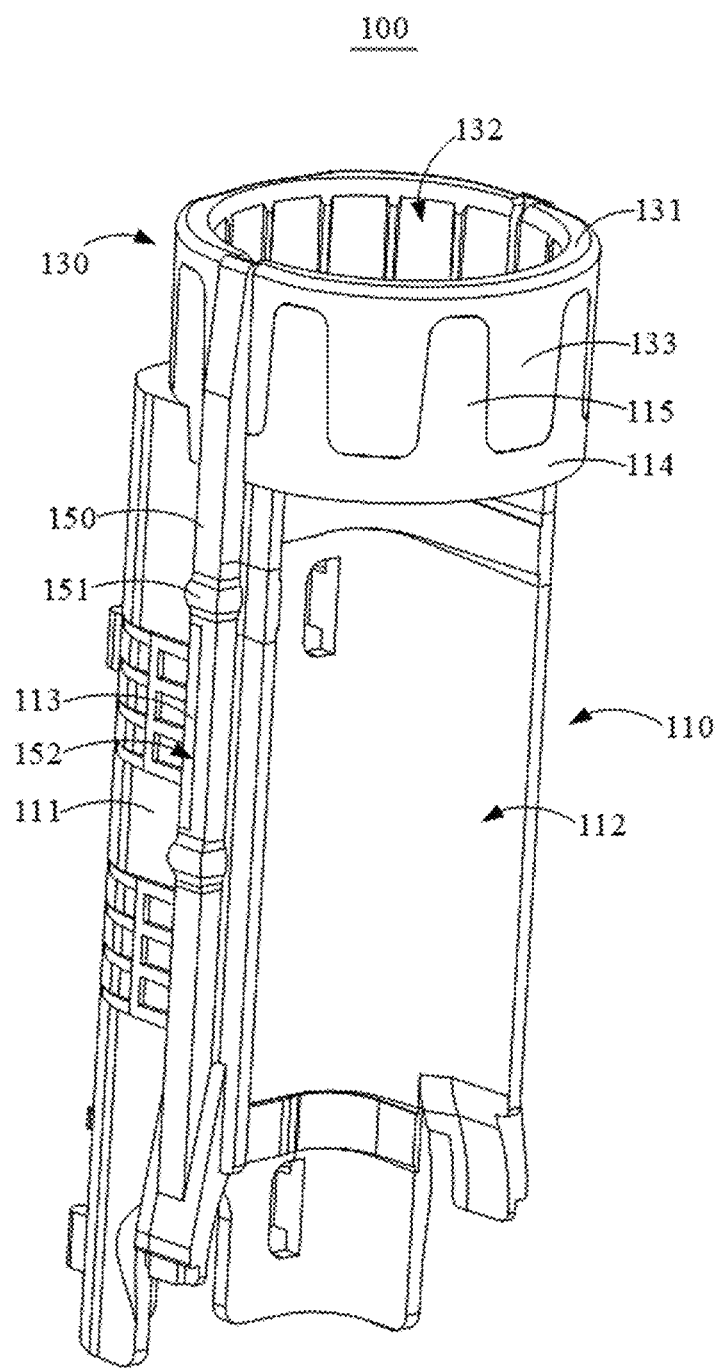
FIG. 1 is a structural schematic view of a holder assembly for an electric toothbrush according to some embodiments of the present disclosure.

| Reference numerals | | | | | |
|---|---|---|---|---|---|
| No. | Name | No. | Name | No. | Name |
| 10 | brush handle assembly | 120 | connection ring | 140 | peripheral limiting portion |
| 100 | holder assembly | 121 | limiting flange | 150 | elastic guide strip |
| 110 | holder body | 130 | elastic cushioning member | 151 | cushioning bump |
| 111 | main body portion | 131 | mounting cylinder | 152 | embedding slot |
| 112 | battery mounting compartment | 132 | motor mounting cavity | 161 | first enclosing portion |
| 113 | embedding protrusion | 133 | motor cushioning portion | 162 | second enclosing portion |
| 114 | connection structure | 134 | peripheral cushioning surface | 163 | connection arm |
| 115 | insertion mating portion | 135 | axial cushioning surface | 200 | housing |
| 116 | peripheral mating surface | 136 | second insertion slot | 300 | motor |
| 117 | axial mating surface | 137 | cushioning protrusion | 310 | motor shaft |
| 118 | insertion protrusion | 138 | inner enclosure wall | 400 | battery |
| 119 | first insertion slot | 139 | limiting convex bar | 20 | brush head assembly |

The realization of the purpose, functional features, and advantages of the present disclosure will be further described in conjunction with the embodiments and with reference to the accompanying drawings.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without creative labor fall within the scope of the present disclosure. In addition, the technical solutions between various embodiments can be combined with each other, but it must be based on the fact that those skilled in the art is able to realize it. When the combination of the technical solutions appears to be contradictory or unattainable, it should be considered that the combination of such technical solutions does not exist, and is not included in the scope claimed by the present disclosure.

It should be noted that when the embodiments of the present disclosure involve directional indications (such as up, down, left, right, forward, back . . . ), the directional indications are only intended to explain a relative positional relationship, a movement, etc. between the various components in a particular attitude. When the particular attitude changes, the directional indications are also changed accordingly.

In addition, when the embodiments of the present disclosure contain descriptions involving "first", "second", etc., the descriptions of "first", "second", etc. are intended only for descriptive purposes, and are not to be construed as indicating or implying their relative importance or implicitly specifying the number of the indicated technical features. That is, a feature defined as "first" or "second" may include at least one such feature either explicitly or implicitly. In addition, the meaning of "and/or" in the whole text is to include three concurrent solutions. For example, "A and/or B" includes an A solution, a B solution, and a solution in which A and B are satisfied at the same time.

The present disclosure proposes a holder assembly for an electric toothbrush.

In some embodiment of the present disclosure, referring to FIGS. 1 to 4, the holder assembly 100 for the electric toothbrush includes a holder body 110 and an elastic cushioning member 130. The holder body 110 includes a main body portion 111 and a connection structure 114 that are connected to each other. The main body portion 111 defines a battery mounting compartment 112, and the connection structure 114 includes an insertion mating portion 115. The elastic cushioning member 130 includes a mounting cylinder 131, and a motor mounting cavity 132 is defined in the mounting cylinder 131. The mounting cylinder 131 includes a motor cushioning portion 133, and the motor cushioning portion 133 and the insertion mating portion 115 are insertion-connected and fixed in an axial direction of the mounting cylinder 131, for connecting the holder body 110 and the elastic cushioning member 130.

The motor cushioning portion 133 includes a peripheral cushioning surface 134 and an axial cushioning surface 135: the insertion mating portion 115 includes a peripheral mating surface 116 and an axial mating surface 117, where the peripheral mating surface 116 abuts against and is mated with the peripheral cushioning surface 134 around the axial direction of the mounting cylinder 131: the axial mating surface 117 abuts against and is mated with the axial cushioning surface 135 around the axial direction of the mounting cylinder 131.

In the embodiments, the holder body 110 may specifically be made of plastic or other rigid material. The elastic cushioning member 130 may be made of silicone, rubber, or other elastic materials. The main body portion 111 and the connection structure 114 of the holder body 110 may be integrally molded into a one-piece structure, or may be separately molded. In some embodiments, the main body portion 111 and the connection structure 114 are integrally molded to improve the structural strength. The connection structure 114 may be connected to an end portion of the main body portion 111, or may be connected to a middle portion of the main body portion 111 or a position adjacent to the end portion, which may be selected and designed according to actual needs. In some embodiments, the connection structure 114 is connected to the end portion of the main body portion 111 in order to improve the compactness of the structure.

The battery mounting compartment 112 is defined on the main body portion 111. Generally, in order to reduce the diameter of the brush handle of the electric toothbrush, a battery 400 is vertically arranged in the brush handle. The main body portion 111 and the battery mounting compartment 112 as a whole are in the shape of a longitudinally extending elongate strip. The main body portion 111 may have many shapes, for example, the main body portion 111 may be a round cylinder, a square cylinder, or a semi-enclosed box-like structure, as long as it can form the battery mounting compartment 112 for the battery 400 to be fixedly mounted, and there is no specific limitation on the specific structure and shape of the main body portion 111.

It can be understood that the motor mounting cavity 132 is configured to adaptively mount a lower end of the motor 300, and the cross-sectional shape of the motor mounting cavity 132 can be adaptively adjusted according to the cross-sectional shape of the motor 300 selected for the electric toothbrush, which is not specifically limited herein. In this way: an axis of the mounting cylinder 131 is made to coincide with an extension direction of a motor shaft 310 of the motor 300. The shape of an outer contour of the cross-section of the mounting cylinder 131 may be set as a circle, an oval, a square, and the like. Since the cross-sectional shape of a housing of the brush handle of the electric toothbrush is usually circular, in order to make the mounting cylinder 131 better adapted to be mounted in the housing of the brush handle, the shape of the outer contour of the cross-section of the mounting cylinder 131 may be set circular.

The connection structure 114 of the holder body 110 includes the insertion mating portion 115, and the insertion mating portion is made of a rigid material. The mounting cylinder 131 of the clastic cushioning member 130 includes the motor cushioning portion 133, and the motor cushioning portion 133 is made of an clastic material. The motor cushioning portion 133 and the insertion mating portion 115 are axially insertion-connected and fixed in the mounting cylinder 131, and in order to improve the solidity of the connection between the two and to avoid the two from detaching from each other in the radial direction of the mounting cylinder 131, the mating surfaces of the motor cushioning portion 133 and the insertion mating portion 115 may be adhesively bonded to each other, or the motor cushioning portion 133 is connected to the insertion mating portion 115 by means of a secondary injection molding process. The rotation of the holder body 110 relative to the clastic cushioning member 130 around the axis of the mounting cylinder 131 and the movement along the axis of the mounting cylinder 131 may be limited by the mating insertion of the insertion mating portion 115 with the motor cushioning portion 133 in the axial direction of the mounting cylinder 131. It will be appreciated that, for the insertion mating portion 115 being mated and insertion-connected with the motor cushioning portion 133 in the axial direction of the mounting cylinder 131, the motor cushioning portion 133 is radially assembled with respect to the insertion mating portion 115 in one of the following two cases: one is that the motor cushioning portion 133 and the insertion mating portion 115 each have an offset surface that is in offset fit with each other in the radial direction, and the other is that the motor cushioning portion 133 and the insertion mating portion 115 do not have an offset surface that is in offset fit with each other in the radial direction of the mounting cylinder 131. i.e., one of the motor cushioning portion 133 and the insertion mating portion 115 is through in the radial direction of the mounting cylinder 131. In both cases, the motor cushioning portion 133 is able to cushion and dampen vibration in the radial direction of the mounting cylinder 131 relative to the insertion mating portion 115.

The motor cushioning portion 133 includes the peripheral cushioning surface 134 and the axial cushioning surface 135, and the number of the peripheral cushioning surfaces 134 and axial cushioning surfaces 135 may each be one or plural, which is not specifically limited herein. The number of the peripheral mating surfaces 116 corresponds to the number of the peripheral cushioning surfaces 134, and the number of the axial cushioning surfaces 135 corresponds to the number of the axial mating surfaces 117. The axial mating surface 117, the axial cushioning surface 135, the peripheral mating surface 116, and the peripheral cushioning surface 134 may each be one of a planar surface, a curved surface, or a combination of a planar surface and a curved surface, as long as the clastic deformation of the clastic cushioning member around the axis of the mounting cylinder 131 can be realized by the offset fit of the peripheral cushioning surface 134 with the peripheral mating surface 116, and the clastic deformation of the clastic cushioning member along the axis of the mounting cylinder 131 can be realized by the offset fit of the axial cushioning surface 135 with the axial mating surface 117.

The motor cushioning portion 133 and the insertion mating portion 115 may have many shapes. For example, one of the motor cushioning portion 133 and the insertion mating portion may be a protrusion structure, and the other may be a groove opening toward the protrusion structure. Of course, the motor cushioning portion 133 and the insertion mating portion may each be a toothed structure that is insertion-connected and mated with each other. By enabling the peripheral cushioning surface 134 of the motor cushioning portion 133 and the peripheral mating surface 116 of the insertion mating portion 115 to abut against and be mated with each other around the axial direction of the mounting cylinder 131. i.e., by enabling the motor cushioning portion 133 to be elastically deformable around the axial direction of the mounting cylinder 131, it is possible to realize an elastic cushioning vibration damping of the clastic cushioning member 130 relative to the holder body 110 around the axial direction of the mounting cylinder 131 while ensuring that the holder body 110 and the clastic cushioning member 130 are limited around the axial direction of the mounting cylinder 131. By enabling the axial cushioning surface 135 of the motor cushioning portion 133 and the axial mating surface 117 of the insertion mating portion 115 to abut against and be mated with each other along the axial direction of the mounting cylinder 131. i.e., by enabling the motor cushioning portion 133 to be elastically deformable along the axial direction of the mounting cylinder 131, it is possible to realize an elastic cushioning vibration damping of the clastic cushioning member 130 relative to the holder body 110 along the axial direction of the mounting cylinder 131 while ensuring that the holder body 110 and the clastic cushioning member 130 are limited along the axial direction of the mounting cylinder 131.

The holder assembly 100 for an electric toothbrush, as proposed in the present disclosure, includes a holder body 110 and an elastic cushioning member 130: the holder body 110 includes a main body portion 111 and a connection structure 114 that are connected to each other: a battery mounting compartment 112 is defined in the main body 111: the connection structure 114 includes an insertion mating portion 115, and the elastic cushioning member 130 includes a mounting cylinder 131: a motor mounting cavity 132 is defined in the mounting cylinder 131: the mounting cylinder 131 includes a motor cushioning portion 133, the motor cushioning portion 133 and the insertion mating portion 115 being insertion-connected and fixed in an axial direction of the mounting cylinder 131, for connecting the holder body 110 and the elastic cushioning member 130. In this way: the holder body 110 for mounting the battery 400 and the elastic cushioning member 130 for mounting the motor 300 are insertion-connected and fixed in the extension direction of the motor shaft 310, which may ensure that the elastic cushioning member can dampen the vibration of the elastic cushioning member relative to the holder body 110 in the radial direction of the mounting cylinder 131. In addition, the holder body 110 and the elastic cushioning member are connected as a whole, such that the battery 400 and the motor 300 can be fixed to the holder assembly 100 together during assembly and assembled into the housing of the brush handle through the holder assembly 100 as a whole, thereby improving the mounting efficiency of the internal structure of the brush handle.

Further, by providing the motor cushioning portion 133 to include the peripheral cushioning surface 134 and the axial cushioning surface 135, and the insertion mating portion 115 to include the peripheral mating surface 116 and the axial mating surface 117, the peripheral mating surface 116 and the peripheral cushioning surface 134 abut against and are mated with each other around the axial direction of the mounting cylinder 131, such that the motor cushioning portion 133 can be elastically deformed with respect to the insertion mating portion 115 around the axial direction of the mounting cylinder 131; the axial mating surface 117 and the axial cushioning surface 135 abut against and are mated with in the axial direction of the mounting cylinder 131, such that the motor cushioning portion 133 can be elastically deformed with respect to the insertion mating portion 115 in the axial direction of the mounting cylinder 131. In this way, after the elastic cushioning member 130 for mounting the motor 300 is fixedly connected to the holder body 110 for mounting the battery 400, elastic cushioning damping can be realized in the axial direction of the motor shaft 310, around the axial direction of the motor shaft 310, and in the radial direction of the motor shaft 310, so as to realize multi-dimensional damping of the elastic cushioning member 130 with respect to the holder body 110, which may effectively enhance the vibration damping effect of the entire holder assembly 100.

In some embodiments, referring to FIGS. 1 to 7, the insertion mating portion 115 includes multiple insertion protrusions 118 spaced along a peripheral direction of the mounting cylinder 131, with a first insertion slot 119 defined between each adjacent two of the insertion protrusions 118: a bottom wall of the first insertion slot 119 and end walls of the insertion protrusions 118 form the axial mating surface 117: side walls of the first insertion slot 119 and side walls of the insertion protrusions 118 form the peripheral mating surface 116.

The motor cushioning portion 133 includes multiple second insertion slots 136 defined on an end wall of the mounting cylinder 131 facing the connection structure 114, the multiple second insertion slots 136 being spaced apart along the peripheral direction of the mounting cylinder 131: a cushioning protrusion 137 is arranged between each adjacent two of the second insertion slots 136: bottom walls of the second insertion slots 136 and an end wall of the cushioning protrusion 137 form the axial cushioning surface 135: side walls of the second insertion slots 136 and side walls of the cushioning protrusion 137 form the peripheral cushioning surface 134.

The multiple cushioning protrusions 137 are in one-to-one correspondence with and adapted to be insertion-connected and fixed with the multiple first insertion slots 119: the multiple insertion protrusions 118 are in one-to-one correspondence with and adapted to be insertion-connected and fixed with the multiple second insertion slots 136.

In the embodiments, it will be appreciated that the bottom wall of the first insertion slot 119, the bottom wall of the second insertion slot 136, the end wall of the insertion protrusion 118, and the end wall of the cushioning protrusion 137 all refer to wall surfaces in the axial direction of the mounting cylinder 131: the side wall of the first insertion slot 119, the side wall of the second insertion slot 136, the side wall of the cushioning protrusion 137, and the side wall of the insertion protrusion 118 all refer to wall surfaces in the peripheral direction of the mounting cylinder 131. The shape of the insertion protrusion 118 and the cushioning protrusion 137 may be variable, for example, they may be in the form of teeth, curved tabs, etc., which is not specifically limited herein. The number of the insertion protrusions 118 and cushioning protrusions 137 may be selected and designed according to actual needs, which is not specifically limited herein. The shapes and widths of the multiple insertion protrusions 118 may be the same or different, and may be selected and designed according to actual needs, which is not specifically limited herein. In this way, the multiple insertion protrusions 118 are spaced apart along the peripheral direction of the mounting cylinder 131, and the spacing between each adjacent two insertion protrusions 118 may be the same or may be different. In some embodiments, the spacing between each adjacent two insertion protrusions 118 is the same to ensure the stability of the insertion mating portion 115 and the motor cushioning portion 133 in the peripheral direction of the insertion mating portion 115. The first mating slot 119 is defined between each adjacent two insertion protrusions 118.

The motor cushioning portion 133 includes multiple second insertion slots 136 spaced along the peripheral direction of the mounting cylinder 131, the second mounting slots being defined on the end wall of the mounting cylinder 131 facing the connection structure 114, such that the second mounting slots are defined each with an opening facing the connection structure 114. The second mounting slot may pass through the inner wall surface and the outer wall surface of the mounting cylinder 131, or may pass through only the inner wall surface or the outer wall surface of the mounting cylinder 131, or may not pass through the inner wall surface and the outer wall surface of the mounting cylinder 131, which is not specifically limited herein. The cushioning protrusion 137 is formed between each adjacent two second insertion slots 136, such that, during the mounting process, the multiple insertion protrusions 118 of the insertion mating portion 115 are in one-to-one correspondence with and adapted to be insertion-connected and fixed within the multiple second insertion slots 136 of the motor cushioning portion 133: the multiple cushioning protrusions 137 of the motor cushioning portion 133 are in one-to-one correspondence with and adapted to be insertion-connected and fixed within the multiple first insertion slots 119 of the insertion mating portion 115. In this way: the motor cushioning portion 133 and the insertion mating portion 115 are insertion-connected and mated with each other, and a solid connection between the holder body 110 and the clastic cushioning member 130 may be realized.

The bottom walls of the first insertion slots 119 and the end walls of the insertion protrusions 118 form the axial mating surface 117, such that the insertion mating portion 115 forms a staggered axial mating surface 117 in the peripheral direction of the mounting cylinder 131. The bottom walls of the second insertion slots 136 and the end walls of the cushioning protrusions 137 form the axial cushioning surface 135, such that the motor cushioning portion 133 forms a staggered axial cushioning surface 135 in the peripheral direction of the mounting cylinder 131. By providing the cushioning protrusions 137 and the second insertion slots 136 of the motor cushioning portion 133 to form the peripheral cushioning surface 134 on the peripherally-oriented two side walls of the mounting cylinder 131, and by providing the insertion protrusions 118 and the first insertion slots 119 of the insertion mating portion 115 to form the peripheral mating surface 116 on the peripherally-oriented two side walls of the mounting cylinder 131, the multiple cushioning protrusions 137 of the motor cushioning portion 133 are adapted to be insertion-connected with the multiple first insertion slots 119 of the insertion mating portion 115, and the multiple insertion protrusions 118 of the insertion mating portion 115 are adapted to be insertion-connected with the multiple second insertion slots 136 of the motor cushioning portion 133. In this way, there are multiple axial cushioning surfaces 135 and axial mating surfaces 117 that fit with each other and multiple peripheral cushioning surfaces 134 and peripheral mating surfaces 116 that fit with each other in the peripheral direction of the mounting cylinder 131. Compared to other structures, an occlusal force between the motor cushioning portion 133 and the insertion mating portion 115 may be effectively increased, thereby making the connection between the motor cushioning portion 133 and the insertion mating portion 115 more stable: further, the axial cushioning area and peripheral cushioning area of the motor cushioning portion 133 and the insertion mating portion 115 may be effectively increased, thereby greatly enhancing the cushioning and vibration damping effect of the clastic cushioning member 130 on the holder body 110, which maximizes the elimination of the vibration damping effect of the holder body 110, and maximizing the elimination of the vibration and noise brought about by vibration of the motor 300 on the holder assembly 100.

Further, as shown in FIGS. 1 to 6, the mounting cylinder 131 further includes an inner enclosure wall 138, the inner enclosure wall 138 enclosing to define the motor mounting cavity 132: the multiple cushioning protrusions 137 are disposed on an outer peripheral wall of the inner enclosure wall 138, and the inner enclosure wall 138 is embedded in an inner periphery of the insertion mating portion 115.

In the embodiments, by providing the mounting cylinder 131 to further include the inner enclosure wall 138, which encloses to define the motor mounting cavity 132, the inner enclosure wall 138 can be better attached to an outer peripheral wall of the motor 300, such that the motor 300 as a whole can be wrapped and radially damped, which further enhances the damping effect of the entire elastic cushioning member 130 while ensuring that the motor 300 is assembled with the mounting cylinder 131 in a solid manner. In addition, by arranging the inner enclosure wall 138, the multiple cushioning protrusions 137 are disposed on the outer peripheral wall of the inner enclosure wall 138, and the inner enclosure wall 138 is embedded in the inner periphery of the insertion mating portion 115, such that the outer wall surface of the inner enclosure wall 138 forms inner wall surfaces of the multiple second insertion slots 136. In this way: when the multiple insertion protrusions 118 are insertion-connected and mated with the multiple second insertion slots 136, the inner wall surfaces of the insertion protrusions 118 can abut against the outer wall surface of the inner enclosure wall 138. As a consequence, the inner enclosure wall 138 can radially limit and cushion the insertion protrusions 118, which further improves the connection and clastic cushioning effect of the motor cushioning portion 133 and the insertion mating portion 115 in the radial direction.

Figure 7:
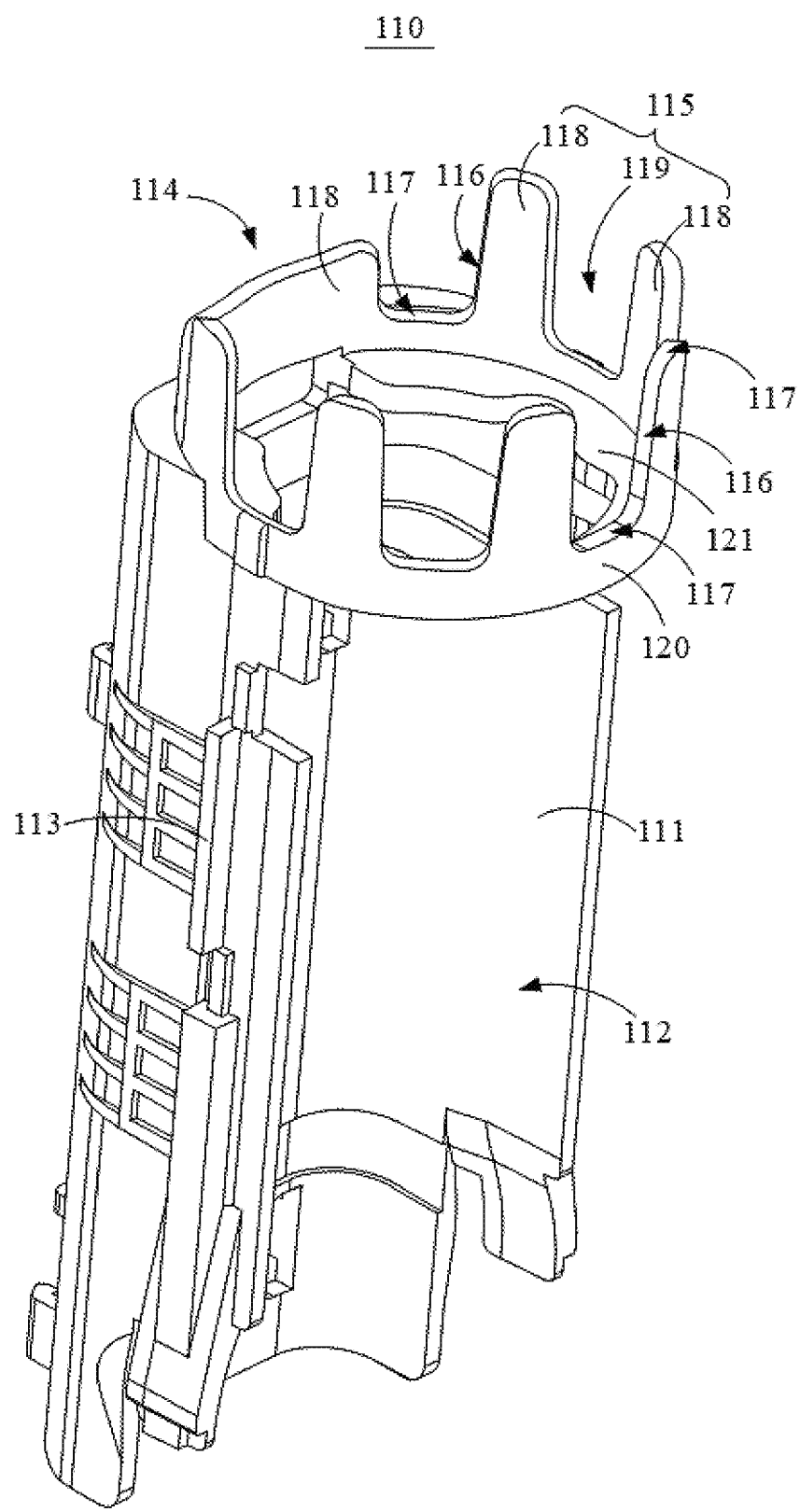
FIG. 7 is a structural schematic view of a holder body according to some embodiments of the present disclosure.

Further, referring to FIGS. 1 and 7, the connection structure 114 further includes a connection ring 120 and a limiting flange 121, the connection ring 120 being connected to an end of the insertion mating portion 115 back away from the mounting cylinder 131: the limiting flange 121 is connected to an inner wall surface of the connection ring 120; the inner enclosure wall 138 protrudes out of the cushioning protrusions 137 toward a peripheral edge of the main body portion 111 to be embedded in the inner wall surface of the connection ring 120 and to abut against the limiting flange 121.

In the embodiments, the connection ring 120 is configured to connect the multiple insertion protrusions 118, and an end wall of the connection ring 120 adjacent to the insertion protrusions 118 forms the bottom walls of the first insertion slots 119. In some embodiments, the connection ring 120 is integrally molded with the multiple insertion protrusions 118 in order to ensure structural strength. The height of the connection ring 120 may be selected and designed according to the required connection strength of the insertion mating portion 115. The shape of the limiting flange 121 may be variable, for example, it may be in the shape of a circle, a wave, an arc block, etc., which is not specifically limited herein. The limiting flange 121 and the connection ring 120 may be integrally molded into a one-piece structure, or may be separately molded, which is not specifically limited herein. The inner enclosure wall 138 of the clastic cushioning member 130 is arranged to protrude out of the cushioning protrusion 137 toward the peripheral edge of the main body portion 111, the part of the inner enclosure wall 138 protruding out of the cushioning protrusion 137 can be embedded in the connection ring 120 and be mated with the connection ring 120, such that the positional limiting and elastic cushioning area of the clastic cushioning member 130 and the holder body 110 in the radial direction of the mounting cylinder 131 may be increased, which may further improve the connection solidity and the elastic cushioning and vibration damping effect of the clastic cushioning member 130 and the holder body 110. By providing the inner enclosure wall 138 of the clastic cushioning member 130 to abut against the limiting flange 121 of the connection structure 114, the axial mating between the clastic cushioning member 130 and the connection structure 114 is limited, and the limiting flange 121 is able to provide a sufficient support area and a support force for the motor 300 and the clastic cushioning member 130, thereby ensuring the assembly effect of the whole machine.

In some embodiments, as shown in FIGS. 1 to 6, an inner wall surface of the inner enclosure wall 138 is arranged with multiple limiting convex bars 139 extending along the axis of the mounting cylinder 131, the multiple limiting convex bars 139 being spaced apart along a peripheral direction of the inner enclosure wall 138, and a protruding height of the limiting convex bars 139 gradually decreasing from the mounting cylinder 131 to the main body portion 111.

In some embodiments, the multiple limiting convex bars are integrally molded with the inner enclosure wall 138. The number of the limiting convex bars 139 may be selected and designed according to actual needs. The distance between each adjacent two limiting convex bars may be the same or different. Since the motor 300 is mounted in the mounting cylinder 131 along the axial direction of the mounting cylinder 131, by making the multiple limiting convex bars 139 all extend along the axis of the mounting cylinder 131, it is more convenient for the motor 300 to be assembled in the mounting cylinder 131. The protruding height of the limiting convex bar 139 is gradually decreased from the mounting cylinder 131 to the main body portion 111, which makes the mounting of the motor 300 in the mounting cylinder 131 smoother, and effectively increases the friction between the motor 300 and the inner wall surface of the mounting cylinder 131, thereby enabling the assembly of the motor 300 with the mounting cylinder 131 to be more stable and effectively prevent the motor 300 from rotating around the axis in the mounting cylinder 131. In addition, since the outer peripheral wall of the motor 300 is in contact with the multiple limiting convex bars 139, a gap is defined between the outer peripheral wall of the motor 300 and the inner wall surface of the inner enclosure wall 138, thereby further reducing the vibration transmitted by the motor 300 to the mounting cylinder 131, so as to improve the cushioning and vibration damping effect of the entire elastic cushioning member 130.

In some embodiments, referring again to FIGS. 1 to 6, an inner peripheral wall of the inner enclosure wall 138 is arranged with a peripheral limiting portion 140 for limiting rotation of the motor 300 about its axis. The peripheral limiting portion 140 may be a limiting protrusion or a positioning slot. Only one peripheral limiting portion 140 may be provided, or multiple peripheral limiting portions 140 may be provided being peripherally spaced around the inner enclosure wall 138. The multiple peripheral limiting portions 140 may all be limiting protrusions or positioning slot, or may be partly limiting protrusions and partly positioning slot, which is not specifically limited herein. The peripheral limiting portion 140 is arranged on the inner peripheral wall of the inner enclosure wall 138, and correspondingly, a mounting base of the motor 300 is arranged with a peripheral mating portion matching with the peripheral limiting portion 140. By arranging the peripheral limiting portion 140 on the inner peripheral wall of the inner enclosure wall 138, after the motor 300 is mounted in the mounting cylinder 131, rotation of the motor 300 about its axis can be limited by means of the cooperation between the peripheral limiting portion 140 and the peripheral mating portion of the motor 300.

Figure 2:
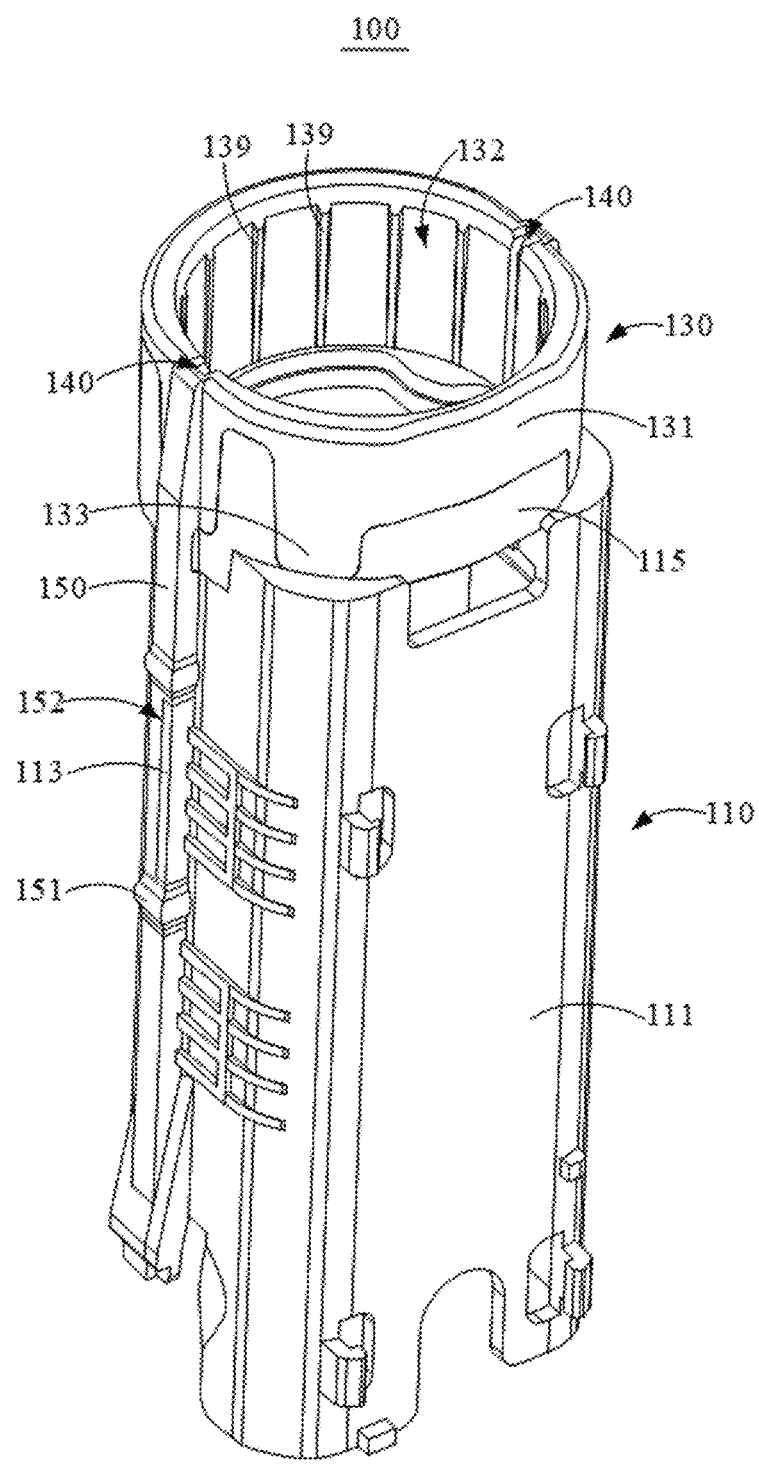
FIG. 2 is a structural schematic view of the holder assembly at another viewing angle.
Figure 3:
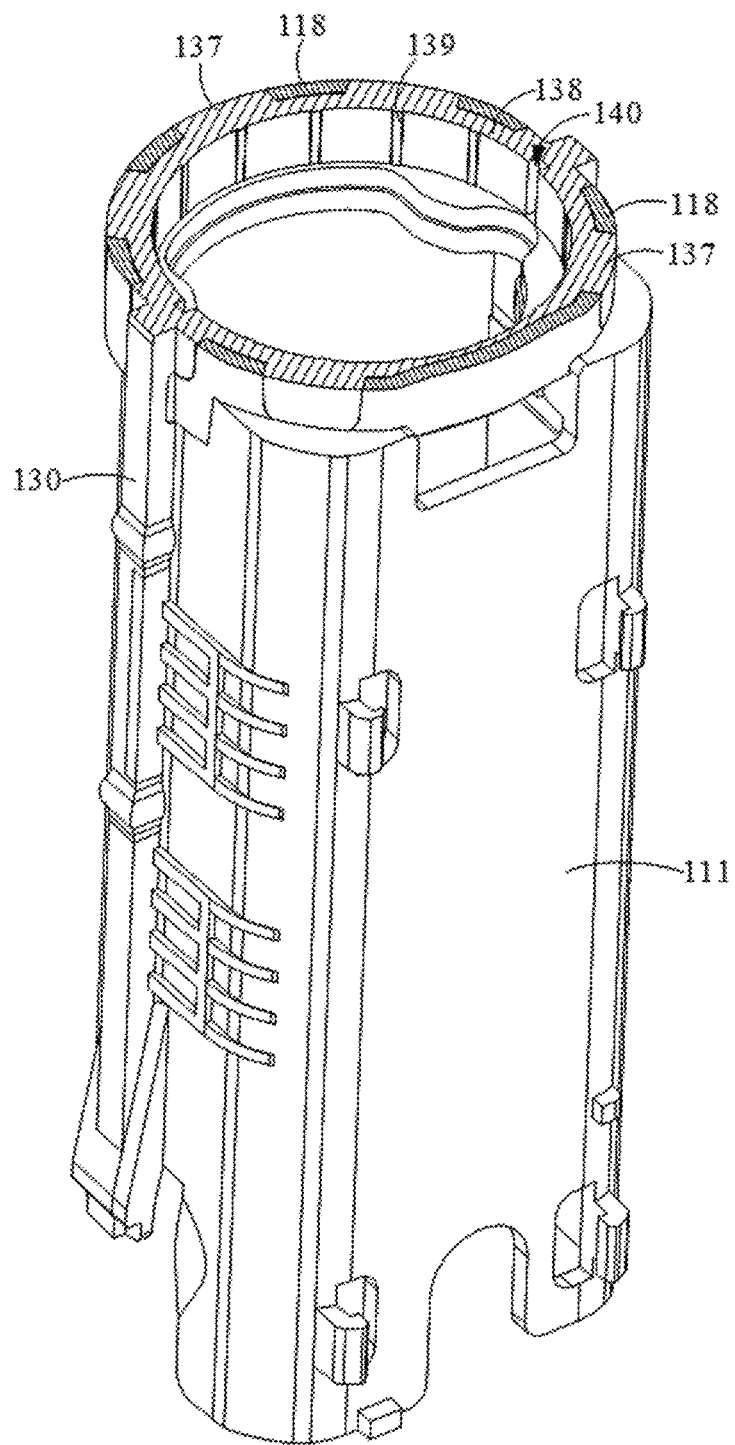
FIG. 3 is a transverse sectional view of the holder assembly in FIG. 2.
Figure 4:
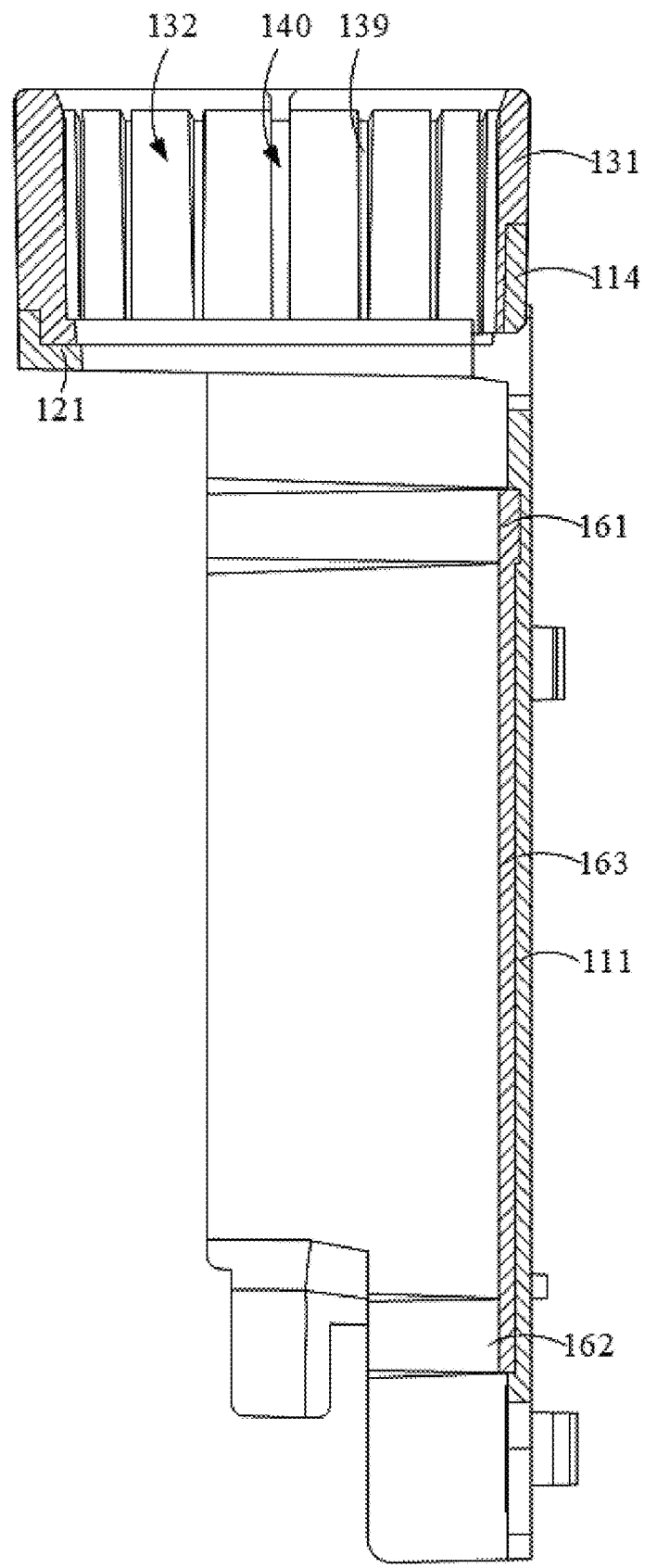
FIG. 4 is a longitudinal sectional view of the holder assembly in FIG. 2.
Figure 5:
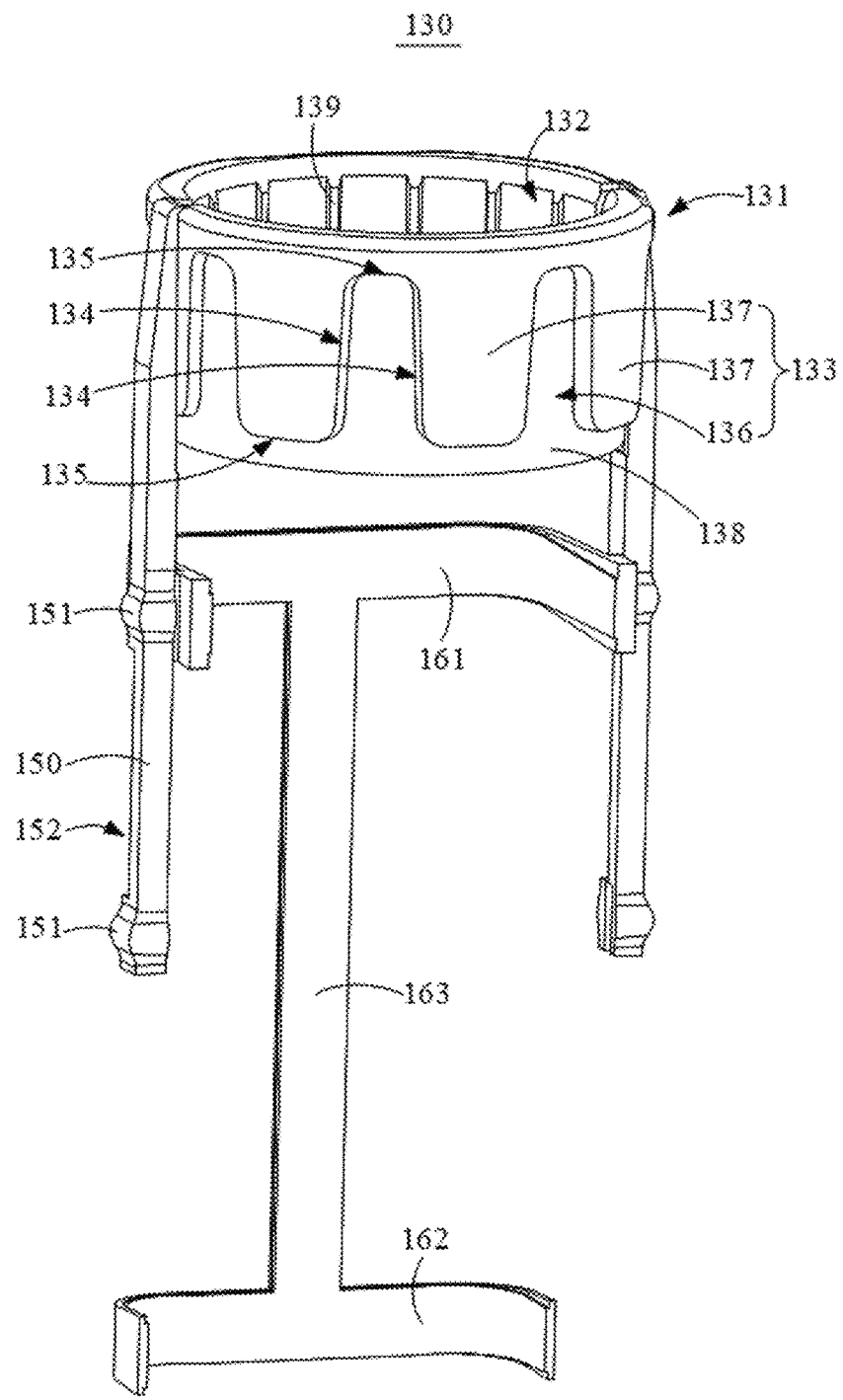
FIG. 5 is a structural schematic view of an elastic cushioning member according to some embodiments of the present disclosure.
Figure 6:
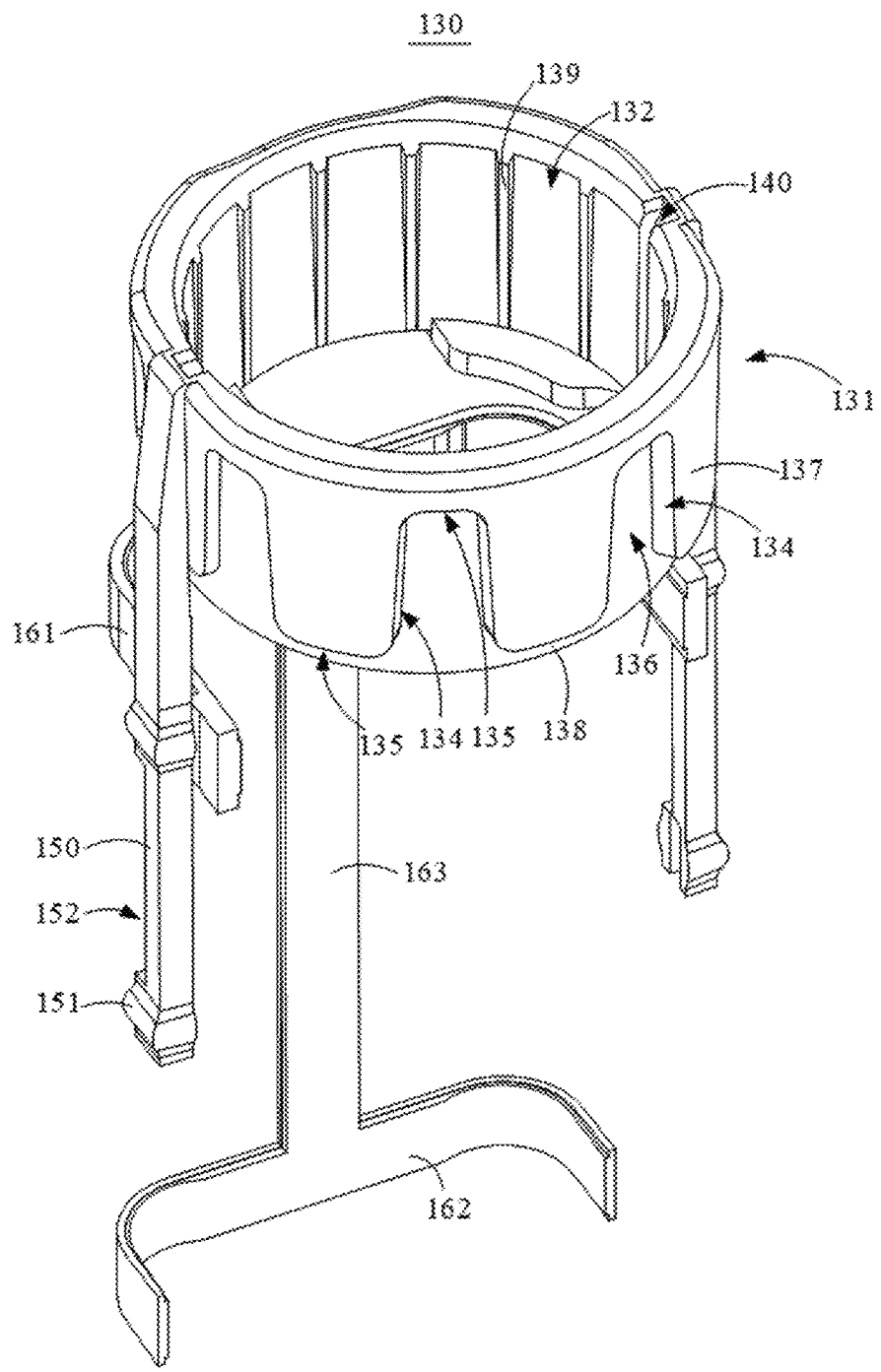
FIG. 6 is a structural schematic view of the elastic cushioning member at another viewing angle.

In some embodiments, as shown in FIGS. 1 to 3, at least part of the cushioning protrusions 137 each has a width in the peripheral direction of the mounting cylinder 131 that is greater than the width of the insertion protrusion 118 adjacent to cushioning protrusion 137 in the peripheral direction of the connection ring 120.

In the embodiments, it is understood that the cushioning protrusion 137 is elastically deformable and mainly plays a role of elastic cushioning, while the insertion protrusion 118 is made of a hard material and mainly plays a role of support. By making the width of at least part of the cushioning protrusions 137 in the peripheral direction of the mounting cylinder 131 greater than the width of the insertion protrusion 118 adjacent thereto, the structural strength of the cushioning protrusions 137 can be improved such that the cushioning protrusions 137 may not be unable to recover due to excessive deformation when the cushioning protrusions 137 are subjected to a large impact force, thereby enhancing the service life of the holder assembly 100 and ensuring the quality of the product.

In some embodiments, referring to FIGS. 1 to 7, the connection structure 114 is connected to an end of the main body portion 111: the width of the cushioning protrusion 137 in the peripheral direction of the mounting cylinder 131 gradually decreases toward the main body portion 111; and the width of the insertion protrusion 118 in the peripheral direction of the mounting cylinder 131 gradually decreases away from the main body portion 111.

In the embodiments, the width of the cushioning protrusions 137 in the mounting cylinder 131 is gradually decreased towards the main body portion 111, and the width of the insertion protrusions 118 is decreased away from the main body portion 111. i.e., the cushioning protrusions 137 and the insertion protrusions 118 are both vertebral structures that are wide at the root and narrow at the top. In this way, the above design provides guidance for the insertion-connection of the cushioning protrusions 137 and the insertion protrusions 118, and makes it easier for the insertion-connection and mating between the multiple cushioning protrusions 137 and the first insertion slots 119, and the insertion-connection and mating between the multiple insertion protrusions 118 and the second insertion slots 136. In addition, it is possible to ensure the strength of the connection of the cushioning protrusions 137 on the mounting cylinder 131, and the strength of the connection of the insertion protrusions 118 on the connection ring 120, so as to avoid the breakage of the cushioning protrusions 137 and the insertion protrusions 118 due to excessive vibration or long-term use.

Further, in the peripheral direction of the connection ring 120, the width of an end face of the cushioning protrusion 137 toward the main body portion 111 may be greater than half of the maximum width of the cushioning protrusion 137, and the width of an end face of the insertion protrusion 118 back away from the main body portion 111 is greater than half of the maximum width of the insertion protrusion 118.

In the embodiments, it is understood that the end face of the cushioning protrusion 137 facing the main body portion 111 is the axial cushioning surface 135, and the end face of the insertion protrusion 118 back away from the main body portion 111 is the axial mating surface 117. If the width of the end face of the cushioning protrusion 137 facing the main body portion 111 is less than half of the maximum width of the cushioning protrusion 137, and the width of the insertion protrusion 118 back away from the main body portion 111 is less than half of the maximum width of the insertion protrusion 118, the widths of the axial cushioning surface 135 and axial mating surface 117 will be too small, and the contact area of the two will be too small, such that the ends of the insertion protrusion 118 and the cushioning protrusion 137 are prone to be deformed, which is unfavorable for the holder body 110 and the clastic cushioning member 130 to withstand too large an impact force in the axial direction of the mounting cylinder 131. By making the width of the end face of the cushioning protrusion 137 facing the main body portion 111 greater than half of the maximum width of the cushioning protrusion 137, and the width of the end face of the insertion protrusion 118 back from the main body portion 111 greater than half of the maximum width of the insertion protrusion 118, the mating area of the cushioning protrusion 137 and the insertion protrusion 118 in the axial direction of the mounting cylinder 131 is sufficiently large, whereby the cushioning protrusion 137 and the insertion protrusion 118 are not easily deformed, such that the impact force that the holder body 110 and the clastic cushioning member 130 can withstand in the axial direction of the mounting cylinder 131 is larger, thereby making the cushioning and vibration damping effect of the entire holder assembly 100 in the axial direction of the mounting cylinder 131 better.

In some embodiments, as shown in FIGS. 1 to 3, 5 to 7, 9, and 10, the clastic cushioning member 130 further includes an clastic guide strip 150 connected to the mounting cylinder 131, the clastic guide strip 150 extending towards the main body portion 111 along the axial direction of the mounting cylinder 131: the clastic guide strip 150 is partially embedded in and protrudes out of an outer peripheral wall of the main body portion 111, and an outer wall surface of the clastic guide strip 150 is arranged with a cushioning bump 151.

In some embodiments, the clastic guide strip 150 is integrally molded with the mounting cylinder 131, and the cushioning bump 151 is integrally molded with the clastic guide strip 150, for ensuring the connection strength. The number of the clastic guide strips 150 may be one, or two, or more than two, etc. When the number of the clastic guide strips 150 is plural, the multiple clastic guide strips 150 may be spaced apart along the peripheral direction of the mounting cylinder 131. The number of the cushioning bumps 151 may be one, or may plural, which are spaced apart along the length of the elastic guide strip 150. By making the clastic guide strip 150 partially embedded and protrude out of the outer peripheral wall of the main body portion 111, the elastic guide strip 150 may be avoided from overhanging, such that the stability of the connection between the clastic guide strip 150 and the main body portion 111 may be ensured. By making the clastic guide strip 150 protrude out of the outer peripheral wall of the main body portion 111, the outer wall surface of the elastic guide strip 150 is arranged with the cushioning bump 151, and when the holder assembly 100 is mounted in the housing of the brush handle, the entire holder assembly 100 is brought into contact with the housing of the brush handle through the cushioning bump 151, which may effectively cushion the holder body 110 and the housing of the brush handle, thereby further reducing vibration transmitted to the brush handle by the entire holder assembly 100.

Further, the mounting cylinder 131 is arranged with at least two the clastic guide strips 150 spaced apart in the peripheral direction, and each clastic guide strip 150 is arranged with at least two the cushioning bumps 151 spaced apart in a length extension direction of the elastic guide strip 150, the cushioning bumps 151 being disposed around the axis of the mounting cylinder 131 on an outer peripheral wall of the clastic guide strip 150.

In the embodiments, by spacing at least two clastic guide strips 150 in the peripheral direction of the mounting cylinder 131, the mounting cylinder 131 and the holder body 110 are able to elastically abut against the housing of the brush handle through the cushioning bumps 151 on both sides in the peripheral direction, so as to ensure that the cushioning force between the holder assembly 100 and the housing of the brush handle is uniform, thereby enhancing the overall cushioning and vibration damping effect. By making the clastic guide strip 150 include at least two cushioning bumps 151 spaced apart in the length extension direction, the elastic cushioning area and cushioning effect between the holder assembly 100 and the housing of the brush handle may be further increased. By making the cushioning bumps 151 disposed around the axis of the mounting cylinder 131 on the outer peripheral wall of the clastic guide strip 150. i.e., the outer wall surfaces of the cushioning bumps 151 each protruding out of a corresponding peripheral sidewall of the clastic guide strip 150, when the clastic guide strip 150 is mated with a guide slot of the housing of the brush handle, the peripheral sidewalls of the clastic guide strip 150 are all offset and mated with an inner wall surface of the guide slot through the cushioning bumps 151, so as to realize the cushioning and vibration damping of the holder body 110 in the radial direction and the peripheral direction thereof, thereby enhance the overall vibration damping effect.

In some embodiments, referring again to FIGS. 1 to 3, 5 to 7, 9 and 10, the clastic guide strip 150 defines an embedding slot 152 between two adjacent cushioning bumps 151, and the outer peripheral wall of the main body portion 111 is arranged with an embedding protrusion 113 that is adapted to the embedding slot 152. In this way, while ensuring the cushioning and vibration damping effect, the connection between the clastic guide strip 150 and the main body portion 111 is made stabler. In some embodiments, the clastic guide strip 150 and the main body portion 111 are integrally injection molded.

On the basis of the above embodiments in which at least two elastic guide strips 150 are provided at intervals along the peripheral direction of the mounting cylinder 131, as shown in FIGS. 1, 4, 5, and 6, the clastic cushioning member 130 further includes a first enclosing portion 161, a second enclosing portion 162, and a connection arm 163 connecting the first enclosing portion 161 with the second enclosing portion 162, that are spaced apart in the axial direction of the mounting cylinder 131.

The first enclosing portion 161 and the second enclosing portion 162 each extend along a peripheral direction of the main body portion 111, and the first enclosing portion 161, the second enclosing portion 162, and the connection arm 163 are embedded in the main body portion 111.

At least one of the first enclosing portion 161 and the second enclosing portion 162 is connected to the multiple clastic guide strips 150.

In order to ensure the structural strength, in some embodiments, the first enclosing portion 161, the second enclosing portion 162, the connection arm 163, and the mounting cylinder 131 are integrally molded into a one-piece structure. In order to facilitate the disassembly and assembly of the battery 400, the first enclosing portion 161 and the second enclosing portion 162 are specifically arranged in a semi-enclosed annular structure. The connection arm 163 extends along the axis of the mounting cylinder 131 to connect a middle part of the first enclosing portion 161 and a middle part of the second enclosing portion 162. At least one of the first enclosing portion 161 and the second enclosing portion 162 is connected to the multiple clastic guide strips 150, such that the multiple clastic guide strips 150 may be better supported, and the overall structure of the elastic cushioning member 130 may be more compact and stable. By making the first enclosing portion 161, the second enclosing portion 162, and the connection arm 163 embedded in the main body portion 111, the connection area between the clastic cushioning member 130 and the main body portion 111 may be effectively increased, thereby realizing a multi-angle connection between the clastic cushioning member 130 and the main body portion 111, such that the connection effect of the two may be ensured: further, the clastic cushioning member 130 is elastically cushioned and mated with the connection structure 114 of the holder body 110 through the mounting cylinder 131, and the clastic cushioning member 130 is elastically cushioned and mated with the main body portion 111 of the holder body 110 through the first enclosing portion 161, the second enclosing portion 162, and the connection arm 163, such that the clastic cushioning connection area between the clastic cushioning member 130 and the holder body 110 may be further increased, thereby enhancing the overall cushioning and vibration damping effect of the holder assembly 100 of the electric toothbrush.

Further, the holder body 110 may be injection molded integrally with the clastic cushioning member 130. Specifically: a secondary injection molding process is applied to inject and connect the clastic cushioning member 130 to the rigid holder body 110. By making the holder body 110 and the clastic cushioning member 130 integrally injection molded, the connection precision between the holder body 110 and the clastic cushioning member 130 may be ensured, and the overall connection strength may be improved, so as to more effectively realize the overall cushioning and vibration damping effect.

Figure 8:
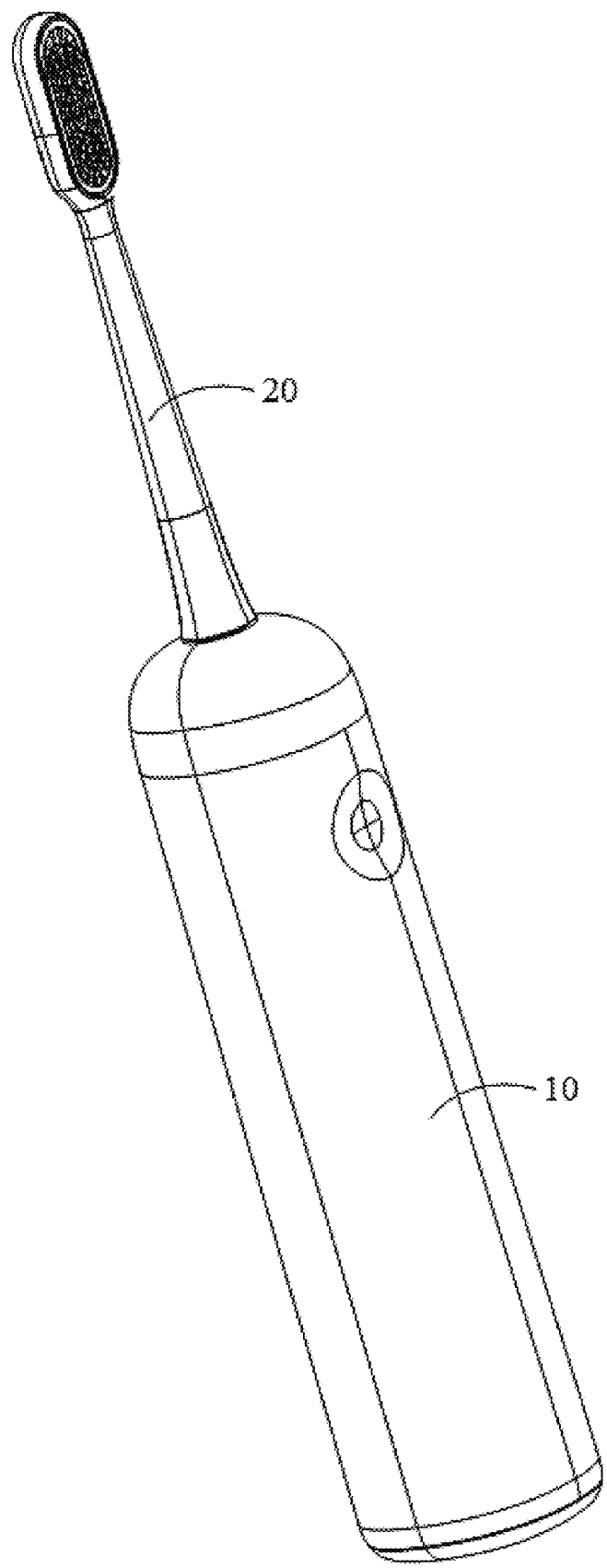
FIG. 8 is a structural schematic view of an electric toothbrush according to some embodiments of the present disclosure.
Figure 9:
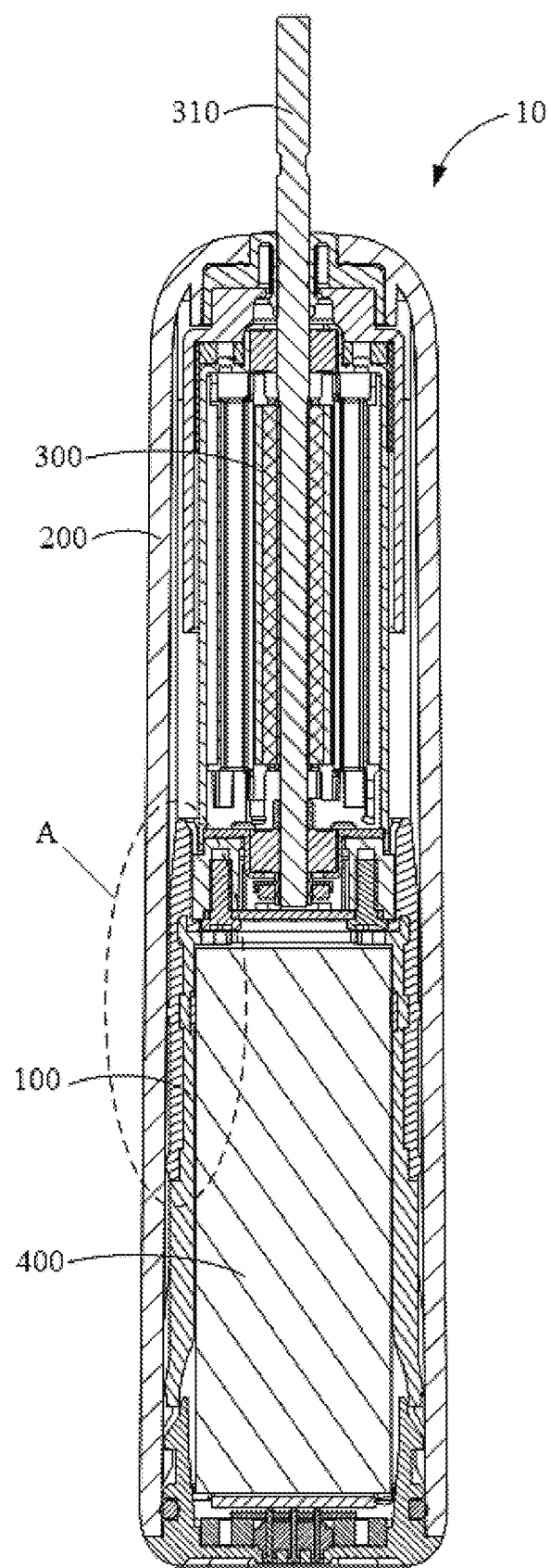
FIG. 9 is a cross-sectional view of a brush handle assembly of the electric toothbrush in FIG. 8.
Figure 10:
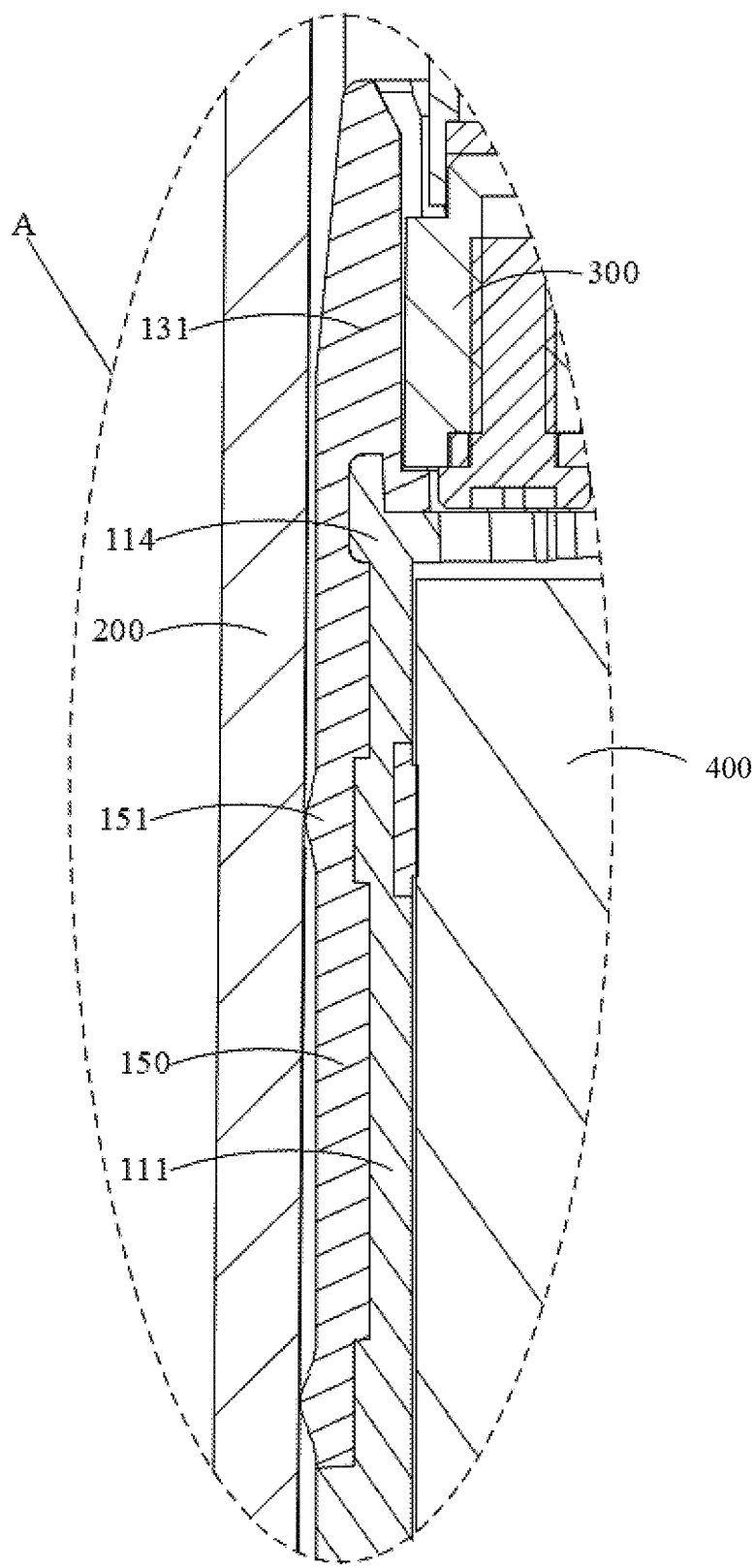
FIG. 10 is a partially enlarged view at area A in FIG. 9.

The present disclosure further proposes an electric toothbrush. Referring to FIGS. 8 to 10, the electric toothbrush includes a brush handle assembly 10, the brush handle assembly 10 including a housing, a motor 300 arranged in the housing, a battery 400, and a holder assembly 100; where the holder assembly 100 has the specific structure referring to the above embodiments. A lower end of the motor 300 is arranged in a motor mounting cavity 132 of the holder assembly 100, and the battery 400 is arranged in a battery mounting compartment 112 of the holder assembly 100. Since the electric toothbrush is adopted with all the technical solutions of all the above embodiments, it has at least all the beneficial effects brought about by the technical solutions of the above embodiments, which will not be repeated herein. The specific structure of the motor 300 and the battery 400 may refer to the related art, and will not be specifically limited herein. Specifically, the brush handle assembly 10 further includes a control assembly; and the motor 300 and the battery 400 are electrically connected through the control assembly. The electric toothbrush further includes a brush head assembly 20, and the brush head assembly 20 is detachably connected to a motor shaft 310 of the brush handle assembly 10. The specific structure of the brush head assembly 20 and the detachable connection between the brush head assembly 20 and the motor shaft 310 may be referred to the related, which will not be repeated herein.

Finally, it should be noted that the above embodiments are only intended to illustrate the technical solutions of the present disclosure, and not to limit them. Although the present disclosure has been described in detail with reference to the foregoing embodiments, those skilled in the art should understand that it is still possible to make modifications to the technical solutions recorded in the foregoing embodiments, or to make equivalent replacements for some of the technical features therein. These modifications or substitutions do not cause the essence of the technical solutions to depart from the spirit and scope of the technical solutions of the embodiments in the present disclosure.

What is claimed is:
1. A holder assembly, for an electric toothbrush, comprising:

a holder body, comprising a main body portion and a connection structure that are connected to each other; wherein the main body portion defines a battery mounting compartment, and the connection structure comprises an insertion mating portion; and an elastic cushioning member, comprising a mounting cylinder; wherein a motor mounting cavity is defined in the mounting cylinder, and the mounting cylinder comprises a motor cushioning portion; the motor cushioning portion and the insertion mating portion are insertion-connected and fixed in an axial direction of the mounting cylinder, for connecting the holder body and the elastic cushioning member;

wherein the motor cushioning portion comprises a peripheral cushioning surface and an axial cushioning surface; the insertion mating portion comprises a peripheral mating surface and an axial mating surface, wherein the peripheral mating surface abuts against and is mated with the peripheral cushioning surface around the axial direction of the mounting cylinder, and the axial mating surface abuts against and is mated with the axial cushioning surface around the axial direction of the mounting cylinder;

wherein the insertion mating portion comprises a plurality of insertion protrusions spaced along a peripheral direction of the mounting cylinder, and a first insertion slot is defined between each adjacent two of the plurality of insertion protrusions; bottom walls of a plurality of the first insertion slots and end walls of the plurality of insertion protrusions form the axial mating surface; side walls of the plurality of first insertion slots and side walls of the plurality of insertion protrusions form the peripheral mating surface;

the motor cushioning portion comprises a plurality of second insertion slots defined on an end wall of the mounting cylinder facing the connection structure, the plurality of second insertion slots being spaced apart along the peripheral direction of the mounting cylinder; a cushioning protrusion is arranged between each adjacent two of the plurality of second insertion slots; bottom walls of the plurality of second insertion slots and end walls of a plurality of the cushioning protrusions form the axial cushioning surface; side walls of the plurality of second insertion slots and side walls of the plurality of cushioning protrusions form the peripheral cushioning surface;

the plurality of cushioning protrusions are in one-to-one correspondence with and adapted to be insertion-connected and fixed with the plurality of first insertion slots; the plurality of insertion protrusions are in one-to-one correspondence with and adapted to be insertion-connected and fixed with the plurality of second insertion slots.

2. The holder assembly according to claim 1, wherein the mounting cylinder further comprises an inner enclosure wall, the inner enclosure wall enclosing to define the motor mounting cavity; the plurality of cushioning protrusions are disposed on an outer peripheral wall of the inner enclosure wall, and the inner enclosure wall is embedded in an inner periphery of the insertion mating portion.

3. The holder assembly according to claim 2, wherein the connection structure further comprises a connection ring and a limiting flange, the connection ring being connected to an end of the insertion mating portion back away from the mounting cylinder; the limiting flange is connected to an inner wall surface of the connection ring; the inner enclosure wall protrudes out of the plurality of cushioning protrusions toward a peripheral edge of the main body portion to be embedded in the inner wall surface of the connection ring and to abut against the limiting flange.

4. The holder assembly according to claim 2, wherein an inner wall surface of the inner enclosure wall is arranged with a plurality of limiting convex bars extending along the axial direction of the mounting cylinder, the plurality of limiting convex bars being spaced apart along a peripheral direction of the inner enclosure wall; a protruding height of each limiting convex bar gradually decreases from the mounting cylinder to the main body portion.

5. The holder assembly according to claim 2, wherein an inner wall surface of the inner enclosure wall is arranged with a peripheral limiting portion for limiting a rotation of a motor about an axis of the motor.

6. The holder assembly according to claim 1, wherein for each of at least one of the plurality of cushioning protrusions, a width of the cushioning protrusion in the peripheral direction of the mounting cylinder is greater than a width of a corresponding insertion protrusion adjacent to a corresponding cushioning protrusion in a peripheral direction of a connection ring.

7. The holder assembly according to claim 6, wherein in a peripheral direction of the connection ring, a width of an end face of each of the plurality of cushioning protrusions toward the main body portion is greater than half of a maximum width of the each of the plurality of cushioning protrusions, and a width of an end face of each of the plurality of insertion protrusions back away from the main body portion is greater than half of a maximum width of the each of the plurality of insertion protrusions.

8. The holder assembly according to claim 1, wherein the connection structure is connected to an end of the main body portion; a width of each of the plurality of cushioning protrusions in the peripheral direction of the mounting cylinder gradually decreases toward the main body portion; a width of each of the plurality of insertion protrusions in the peripheral direction of the mounting cylinder gradually decreases away from the main body portion.

9. The holder assembly according to claim 1, wherein the elastic cushioning member further comprises an elastic guide strip connected to the mounting cylinder, the elastic guide strip extending towards the main body portion along the axial direction of the mounting cylinder; the elastic guide strip is partially embedded in and protrudes out of an outer peripheral wall of the main body portion, and an outer wall surface of the elastic guide strip is arranged with a cushioning bump.

10. The holder assembly according to claim 9, wherein the elastic guide strip comprises at least two elastic guide strips spaced apart in the peripheral direction of the mounting cylinder, and each of the at least two elastic guide strips is arranged with at least two the cushioning bumps spaced apart in a length extension direction of the each of the at least two elastic guide strips; the at least two cushioning bumps are disposed around the axial direction of the mounting cylinder on an outer peripheral wall of the each of the at least two elastic guide strips.

11. The holder assembly according to claim 10, wherein the each of the at least two elastic guide strips defines an embedding slot between adjacent two of the at least two cushioning bumps, and the outer peripheral wall of the main body portion is arranged with an embedding protrusion that is adapted to the embedding slot.

12. The holder assembly according to claim 10, wherein the elastic cushioning member further comprises a first enclosing portion, a second enclosing portion, and a connection arm connecting the first enclosing portion with the second enclosing portion, that are spaced apart in the axial direction of the mounting cylinder;

each of the first enclosing portion and the second enclosing portion extends along a peripheral direction of the main body portion, and the first enclosing portion, the second enclosing portion, and the connection arm are embedded in the main body portion;

at least one of the first enclosing portion and the second enclosing portion is connected to the at least two elastic guide strips.

13. The holder assembly according to claim 1, wherein the holder body is injection molded integrally with the elastic cushioning member.

14. An electric toothbrush, comprising a brush handle assembly; wherein the brush handle assembly comprises a housing, a motor arranged in the housing, a battery, and the holder assembly according to claim 1; a lower end of the motor is arranged in the motor mounting cavity of the holder assembly, and the battery is arranged in the battery mounting compartment of the holder assembly.

15. The electric toothbrush according to claim 14, wherein the mounting cylinder further comprises an inner enclosure wall, the inner enclosure wall enclosing to define the motor mounting cavity; the plurality of cushioning protrusions are disposed on an outer peripheral wall of the inner enclosure wall, and the inner enclosure wall is embedded in an inner periphery of the insertion mating portion.

16. The electric toothbrush according to claim 15, wherein for each of at least one of the plurality of cushioning protrusions, a width of the cushioning protrusion in the peripheral direction of the mounting cylinder is greater than a width of a corresponding insertion protrusion adjacent to a corresponding cushioning protrusion in a peripheral direction of a connection ring.

17. The electric toothbrush according to claim 14, wherein the elastic cushioning member further comprises an elastic guide strip connected to the mounting cylinder, the elastic guide strip extending towards the main body portion along the axial direction of the mounting cylinder; the elastic guide strip is partially embedded in and protrudes out of an outer peripheral wall of the main body portion, and an outer wall surface of the elastic guide strip is arranged with a cushioning bump.

18. The electric toothbrush according to claim 14, wherein the holder body is injection molded integrally with the elastic cushioning member.

* * * * *